(12) United States Patent
Cho et al.

(10) Patent No.: US 10,329,811 B2
(45) Date of Patent: Jun. 25, 2019

(54) FRONT POP-UP LATCH SAFETY HOOK STRUCTURE FOR ACTIVE HOOD OF VEHICLE

(71) Applicant: KIA MOTORS CORPORATION, Seoul (KR)

(72) Inventors: Tae Young Cho, Seoul (KR); Jin Pyung Park, Seoul (KR)

(73) Assignee: KIA MOTORS CORPORATION, Seoul (KR)

( * ) Notice: Subject to any disclaimer, the term of this patent is extended or adjusted under 35 U.S.C. 154(b) by 695 days.

(21) Appl. No.: 14/925,849

(22) Filed: Oct. 28, 2015

(65) Prior Publication Data

US 2016/0186471 A1 Jun. 30, 2016

(30) Foreign Application Priority Data

Dec. 31, 2014 (KR) .................. 10-2014-0194597

(51) Int. Cl.
*E05C 19/00* (2006.01)
*B60R 21/38* (2011.01)
*E05C 3/12* (2006.01)
*E05C 19/12* (2006.01)

(52) U.S. Cl.
CPC ............ *E05C 19/009* (2013.01); *B60R 21/38* (2013.01); *E05C 3/12* (2013.01); *E05C 19/12* (2013.01)

(58) Field of Classification Search
CPC .......... E05B 83/24; E05B 77/08; E05B 79/20; E05B 83/243; B60R 21/38; B60R 21/34; B60R 21/013; Y10S 292/14; Y10S 292/65; Y10T 292/0908; E05Y 2900/536

USPC ............ 292/97, DIG. 65, DIG. 43, DIG. 42, 292/DIG. 29, DIG. 14
See application file for complete search history.

(56) References Cited

U.S. PATENT DOCUMENTS

| 6,581,987 | B1* | 6/2003 | Gentile | .................. E05B 83/24 |
| | | | | 292/216 |
| 8,573,658 | B2* | 11/2013 | Kim | ........................ B60R 21/34 |
| | | | | 292/201 |
| 9,145,716 | B2* | 9/2015 | Jayasuriya | .............. E05B 77/08 |
| 9,157,259 | B2* | 10/2015 | Johnson | ................. E05B 83/24 |
| 9,340,179 | B2* | 5/2016 | Kim | ........................ B60R 21/38 |

(Continued)

FOREIGN PATENT DOCUMENTS

| CN | 102416983 A | 4/2012 |
| JP | 2007-069643 A | 3/2007 |

(Continued)

*Primary Examiner* — Mark A Williams
(74) *Attorney, Agent, or Firm* — Morgan, Lewis & Bockius LLP

(57) ABSTRACT

A front pop-up latch safety hook structure for an active hood of a vehicle having a front end module (FEM) including a front end carrier is provided. The structure includes a plate-shaped frame and a striker mounted on a front surface of the plate-shaped frame and fixed to a bottom of the hood. A safety hook is provided in front of the front end carrier of the FEM and is movable to an engagement location with the striker and a release location from the striker. A latch is configured to engage with or to disengage from the striker. A pop-up means is configured to pop up a hood by forcibly lifting the striker while the latch engages with the striker as the safety hook disengages from the striker when a collision of the vehicle occurs.

7 Claims, 4 Drawing Sheets

(56) References Cited

U.S. PATENT DOCUMENTS

| | | | | |
|---|---|---|---|---|
| 9,637,082 | B2* | 5/2017 | Ferri | B62D 25/10 |
| 9,863,170 | B2* | 1/2018 | Park | E05B 83/24 |
| 2007/0246944 | A1* | 10/2007 | Sundararajan | B60R 21/38 |
| | | | | 292/92 |
| 2012/0074715 | A1* | 3/2012 | Kim | B60R 21/34 |
| | | | | 292/201 |
| 2012/0306237 | A1* | 12/2012 | Farooq | B60R 21/38 |
| | | | | 296/193.11 |
| 2014/0158450 | A1* | 6/2014 | Hasselblad | B60R 21/38 |
| | | | | 180/274 |
| 2015/0224956 | A1* | 8/2015 | Takenaka | B60R 21/36 |
| | | | | 73/862.381 |

FOREIGN PATENT DOCUMENTS

| | | |
|---|---|---|
| KR | 10-2008-0114150 A | 12/2008 |
| KR | 10-2010-0025114 A | 3/2010 |
| KR | 10-2010-0125642 A | 12/2010 |
| KR | 10-2013-0051598 A | 5/2013 |
| KR | 10-2014-0037506 A | 3/2014 |
| KR | 10-2014-0052102 A | 5/2014 |
| KR | 10-1471523 B1 | 12/2014 |

\* cited by examiner

FRONT POP-UP LATCH SAFETY HOOK STRUCTURE FOR ACTIVE HOOD OF VEHICLE

CROSS-REFERENCE TO RELATED APPLICATION

This application claims under 35 U.S.C. § 119(a) the benefit of priority to Korean Patent Application No. 10-2014-0194597 filed on Dec. 31, 2014, the entire contents of which are incorporated herein by reference.

TECHNICAL FIELD

The present invention relates to a front pop-up latch safety structure for an active hood of a car, and particularly, to a front pop-up latch safety structure for an active hood which is enhanced to decrease the length of a striker by simultaneously rotating a safety hook in latch pop-up and apply a hood latch to a narrow space in front of an FEM.

BACKGROUND

In general, an engine room is provided in front of a sedan vehicle and the engine room is sealed by a hood. The engine room is designed in such a manner that various components such as an engine, and the like are compactly deployed and the hood is designed in a significantly strong structure so as to solidly seal the engine.

A front vehicle body of a vehicle includes an inner panel part having a dash panel, a wheel house, and a front fender and an outer panel part having the hood and a front end panel, and since the front vehicle body of the vehicle has a structure in which the respective panels are separately manufactured and then the respect panels are spot-welded and coupled to predetermined portions, degree management is disadvantageous and work is complicated, and as a result, workability deteriorates.

In order to solve the problem, in recent years, several panels are integrally manufactured in a module form, and as a result, a radiator, a headlamp, and a hood latch may be mounted on various panels and in general, a scheme is applied, in which a front end module (FEM), that is, a front end carrier of the vehicle body, a bumper beam of a design, the headlamp, and an air-conditioner system of a chassis is mounted in one step in-line to increase productivity.

As such, in an FEM-adopted vehicle, an active latch pop-up structure can be applied to only the hood latch assembled to the rear of the FEM in terms of a layout and when applied to the front of the FEM, the length of a striker increases, and as a result, it is difficult to apply the active latch pop-up structure to a vehicle model in which the layout such as a design, or the like is narrow.

In a front collision accident of a pedestrian, the pedestrian primarily collides with a front bumper of the vehicle and thereafter, a head of the pedestrian secondarily collides with the strong hood while the pedestrian falls toward the hood, and as a result, damage to the pedestrian increases.

In order to solve the problem, in recent years, a pedestrian protection regulation is enforced, and as a result, there is a trend that an active hood system in which the hood moves between the hood and the engine room so as to absorb impact energy of the pedestrian in the collision accident of the pedestrian has been applied.

As an example of the active hood system in the related art, a structure in which a striker support is formed above a front portion so as to support the striker that engages in a latch of a vehicle portion is disclosed in Japanese Patent Laid-open Application No. 2007-069643.

As another example of the active hood system, a hood latch device for a vehicle in which a hood safety lever drops together with the striker in locking by the striker is disclosed in Korean Patent Unexamined Publication No. 10-2010-0125642.

As yet another example, a lift device of the active hood in which the latch and the striker can be released by an explosion scheme of a small explosive trigger to reduce a secondary impact of the pedestrian against a momentary collision accident and miniaturize a product is disclosed in Korean Patent Unexamined Publication No. 10-2014-0037506.

The hood latch devices in the related art has a problem in that even though the length of the striker is adjusted, the safety hook interrupts reward movement of the striker, and in order to prevent the problem, the safety lever needs to be dropped together with the increase in length of the striker, but it is difficult to secure a space for increasing the length of the striker or dropping the safety lever at the narrow front of the FEM and, in particular, when the length of the striker is increased to assemble the hood latch device, a crack may occur on the periphery of the striker.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the above-described problems associated with prior art.

Embodiments of the present invention have been made in an effort provide a front pop-up latch safety hook structure for an active hood enhanced to be easily applied even in a narrow front of an FEM by rotating a safety hook to disengage from a striker together with a latch passive in latch pop-up without an increase in the length of a striker.

In one aspect, the present invention provides a front pop-up latch safety hook structure for an active hood of a car vehicle having a front end module (FEM) including a front end carrier. The structure includes: A safety hook is provided at a plate-shaped frame in front of a front end module (FEM), and movable to an engagement location with a striker and a release location from the strikerA latch is configured to engage with or disengage from the striker. A pop-up means is configured to pop up the hood by forcibly lifting the striker while the latch engages with the striker as the safety hook disengages from the striker when a collision of the vehicle occurs. In certain embodiments, the collision of the vehicle is a pedestrian collision accident.

In certain embodiments, the pop-up means may include an actuator provided on the bottom of the plate-shaped frame and configured to be actuated by a sensor when the pedestrian collision accident occurs, a pop-up lever pivotably mounted adjacent to the actuator, and a pop-up guide pivotably mounted near the pop-up lever.

In certain embodiments, the latch may be configured to pivot and engage the striker by the pop-up means when the pedestrian collision accident occurs.

In certain embodiments, the latch may include a latch passive on the bottom thereof and when the latch passive pivots, the latch may pivot in a direction to disengage from the striker by interlocking with the safety hook.

In certain embodiments, the safety hook may integrally include a lever portion and the lever portion may interlock when the latch passive pivots.

In certain embodiments, the lever portion of the safety hook may be deployed to move by a pin that protrudes in a lateral direction from the latch passive.

In certain embodiments, the pin of the latch passive may be deployed through a slot formed in the frame and the lever portion of the safety hook may be deployed through the slot to pivot the safety hook in the direction to disengage from the striker by pushing the lever portion by the pin when the latch passive pivots together with the latch.

In certain embodiments, in a front pop-up latch safety hook structure for an active hood of a car according to the present invention, when a striker is lifted, a safety hook pivots rearward not to interrupt the striker to be installed at a narrow front of an FEM having a narrow space without an increase in length of the safety hook.

Further, in certain embodiments, according to the front pop-up latch safety hook structure for an active hood of a car, the safety hook integrally includes a lever portion that interlocks with a pin of a latch passive and when the latch pivots while engaging in the striker, the striker pivots while disengaging from the latch to reduce the size of the striker, and as a result, a degree of design freedom is increased together with enhancement of an exterior and a crack on the periphery of the striker is prevented even with reduction of the size of the striker, thereby maintaining durability.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
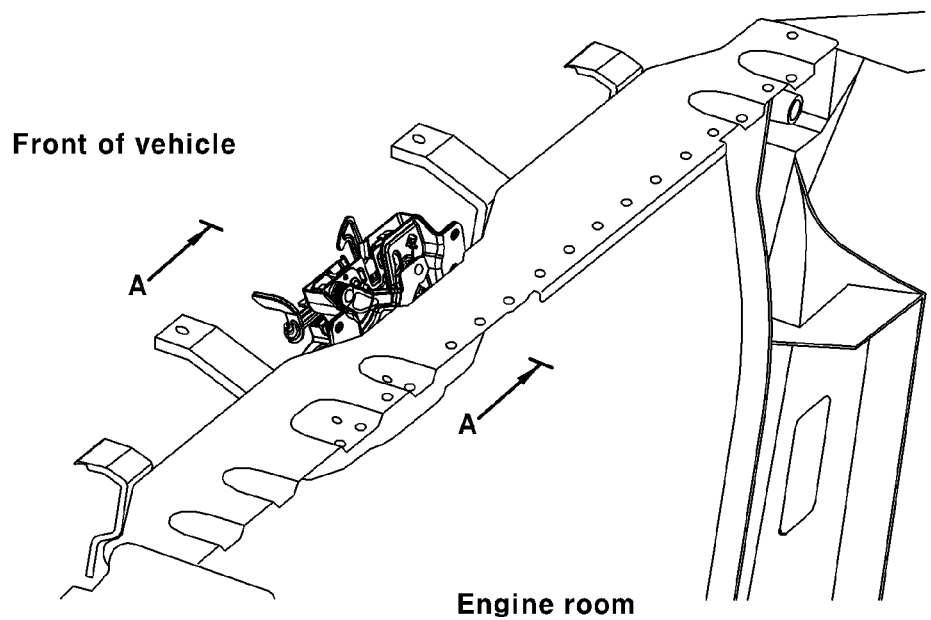
FIG. 1 is a schematic perspective view illustrating a pop-up latch safety hook structure of the present invention is applied to a front of a front end carrier of a front end module (FEM) according to an embodiment of the present invention.

It should be understood that the appended drawings are not necessarily to scale, presenting a somewhat simplified representation of various preferred features illustrative of the basic principles of the invention. The specific design features of the embodiments of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, certain embodiments of the present invention will be described in more detail with reference to the accompanying drawings illustrating embodiments of the present invention.

In FIG. 1, the pop-up latch safety hook structure according to an embodiment of the present invention is applied to a front of a front end carrier of a front end module (FEM).

Figure 2:
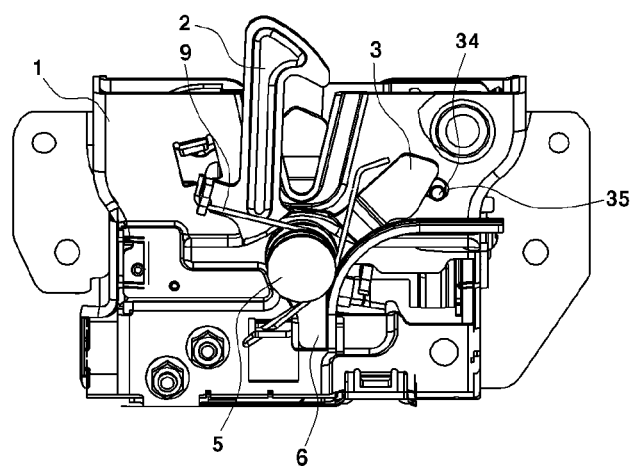
FIG. 2 is a schematic front view of the pop-up latch safety hook structure of an embodiment of the present invention viewed from a front side.
Figure 3:
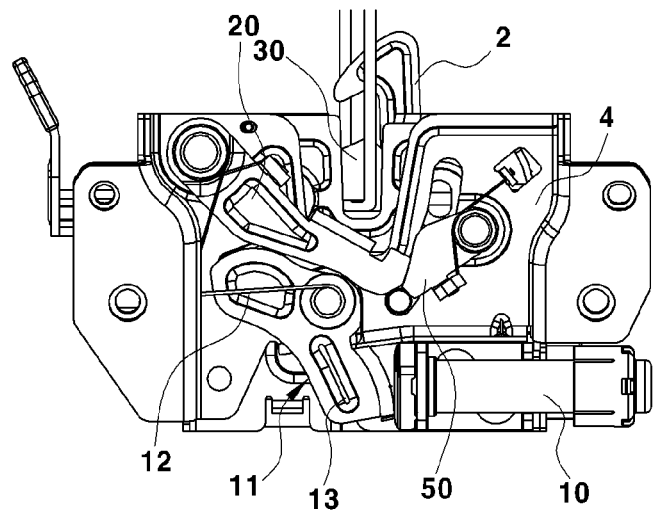
FIG. 3 illustrates the pop-up latch safety hook structure mounted on a frame viewed from a rear side of FIG. 2.
Figure 4:
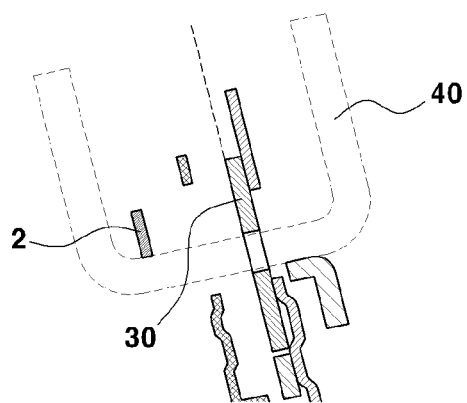
FIG. 4 is a schematic cross-sectional side view taken along line A-A' in FIG. 1 illustrating the pop-up latch safety hook structure of an embodiment of the present invention, engaged with a striker having a reduced length shown in a dotted line.

FIG. 2 illustrates a safety hook at a front side of a case. FIG. 3 illustrates a structure for lifting a striker so as to pop up a hood when a collision accident of a pedestrian occurs on a rear surface side of a case on a rear surface side of FIG. 2. FIG. 4 schematically illustrates side arrangement of a safety hook 2 and a pop up latch 30 ( ) in cross-sectional side view taken along line A-A' in FIG. 1 which are mounted on the front of the front end carrier of the FEM and are engaged with the hood striker 40 having decreased length as compared with the related art.

In FIGS. 2 and 3, a safety hook 2 is pivotably mounted on a shaft 5 on a front surface of a plate-shaped frame 4 behind a cover 1 at the front side of the case and for example, a safety hook 2 is elastically maintained while standing upright by a torsion spring 9 as illustrated in FIGS. 2 and 3.

According to certain embodiments of the present invention, the safety hook 2 has a hook handle 6 that extends downward and has a level shape to operate the hook in order to open the hood with hands and a lever portion 3 for pivoting the safety hook counterclockwise in FIG. 2 and clockwise in FIG. 3 so that the safety hook 2 pivots to deviate from an engagement location in the striker 40. In certain embodiments, the hook handle 6 and the lever portion 3 are integrally formed.

According to certain embodiments of the present invention, provided is a pop-up means that pops up the hood even while the latch 30 engages in the striker 40 as the safety hook 2 disengages from the striker 40 when the pedestrian collision accident occurs. In certain embodiments, the pop-up means may include, for example, a powder type actuator 10 provided on the bottom of the plate-shaped frame 4, a pop-up lever 11 mounted pivotably adjacent to the actuator, and a pop-up guide 20 pivotably mounted near the pop-up lever 11.

The latch 30 among the tops of the frame 4 may be deployed to engage in the striker 40 fixed onto the bottom of the hood to be disengaged and further, may include a latch passive 31 therebelow, the latch 30 pivot together when the latch passive 31 pivot.

Although not illustrated, in general, in certain embodiments, a driver pulls an operation lever, and as a result, a wire is pulled to pivot the latch in the vehicle. Therefore, the striker 40 and the latch 30 disengage from each other.

However, although the driver does not disengage the latch from the striker in the pedestrian collision accident, the pop-up means according to the present disclosure pops up the hood.

As a result, when the striker is lifted as the pop-up means operates so as not to prevent the striker from being lifted while the safety hook engages in the latch at the time of operating the pop-up means, the safety hook pivots so that the safety hook deviates from the striker engaging in the striker.

To this end, in certain embodiments, in the latch passive 31, a pin 34 is formed in a lateral direction to protrude through a slot 35 formed in the frame 4 and when the lever portion 3 of the safety hook 2 is deployed through the slot 35, as the pin 34 moves in the slot 35, the safety hook 2 pivots counterclockwise in FIG. 2 and clockwise in FIG. 3 by pushing the lever portion 3 and in this case, the latch 30 pivots together with the latch passive 31.

An operation of the active pop-up latch safety hook structure having such a structure of an embodiment of the present invention will be described with reference to FIGS. 5 to 7.

Figure 5:
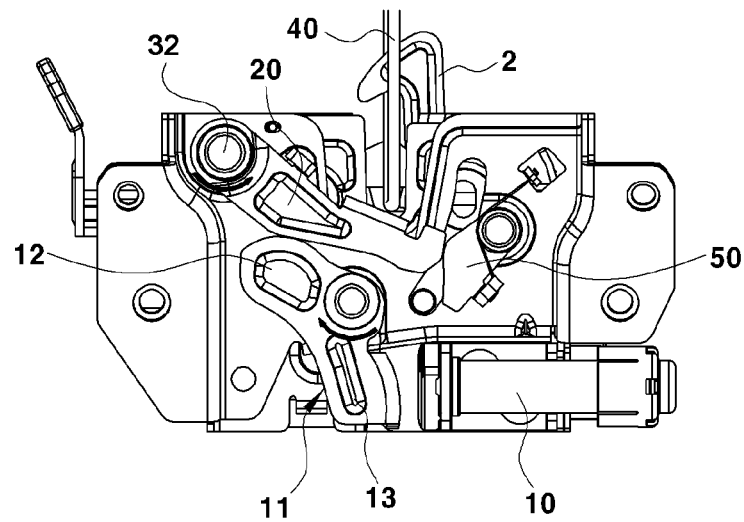
FIGS. 5 to 7 are diagrams schematically illustrating an operation of the pop-up latch safety hook structure of an embodiment of the present invention.

For example, in certain embodiments, when the accident in which the pedestrian collides with the front of the vehicle occurs, the powder type actuator 10 is actuated by a control unit receiving a signal from a pedestrian collision sensor (not illustrated), and as a result, the pop-up lever 11 pivots clockwise in FIG. 5. The pop-up lever 11 is constituted by a top 12 and a bottom 13 which is curved downward therefrom and the bottom 13 is deployed adjacent to the powder type actuator 10.

In certain embodiments, as the bottom 13 of the lever is pushed in a left direction in the figure when the powder type actuator is actuated, while the top 12 pivots clockwise, the pop-up guide 20 adjacent to the top 12 pivots upward counterclockwise in FIG. 5 and strongly continuously pushes up the striker 40.

Figure 6:
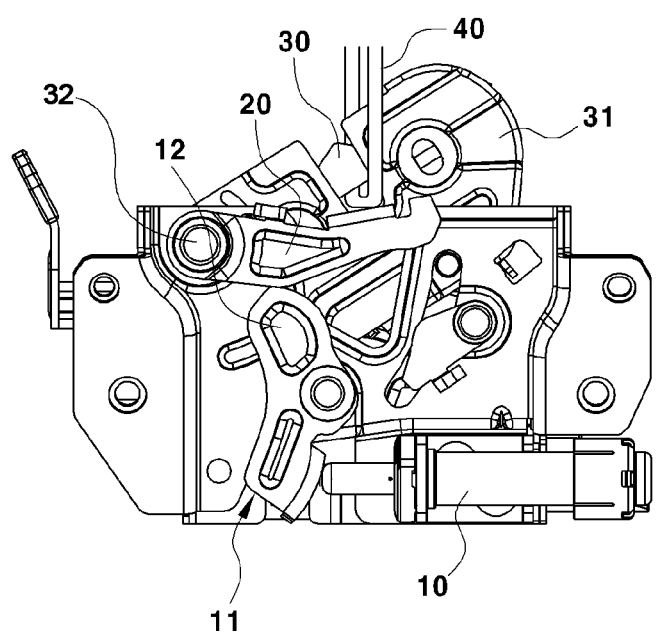
Figure 7:
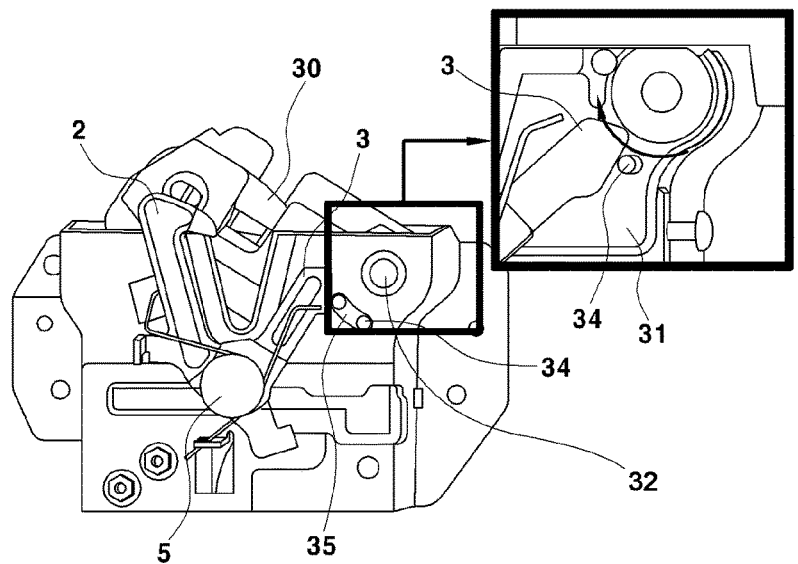

In this case, in certain embodiments, while the latch 30 and the latch passive 31 which engage the striker 40 engage the striker, the latch 30 and the latch passive 31 protrude on the top of front and rear plates 1 and 4 while pivoting counterclockwise with respect to the pivot shaft 32 as illustrated in FIGS. 6 and 7. Reference numeral 50 represents a pivotable pole which engages in the pop-up guide to prevent the pop-up guide 20 from pivoting in normal times and when the actuator is actuated, the pop-up guide 20 rotates the pole 50 to a release location by rotational force of the pop-up lever by explosive power thereof.

Further, in certain embodiments, as the latch passive 31 pivots, while the pin 34 formed in the lateral direction of the latch passive moves along the arc-shaped slot 35 formed on the rear plate 4, as the lever portion 7 of the safety hook 2 deployed through the slot 35 pivots upward counterclockwise, the safety hook 2 pivots in the left direction counterclockwise around the shaft 5 in FIG. 7 to allow the striker to move upward with respect to the front and rear plates 2 and 4 of the case together with the latch and the latch passive, and as a result, the hood is opened at a predetermined height.

As a result, in certain embodiments, when a pedestrian who has an accident hits the hood, since the hood on which the striker is mounted absorbs shock while moving downward with an interval opened at a predetermined height, damage by a primary collision of the pedestrian may be further reduced.

In the front pop-up latch safety hook structure for the active hood of a car according to certain embodiments of the present invention, when the striker is lifted, the safety hook pivots rearward not to interrupt the striker to be installed at the front of an FEM having a narrow space without an increase in length of the safety hook.

Further, in the front pop-up latch safety hook structure for the active hood of the car according to certain embodiments of the present invention, the size of the striker may be decreased, and as a result, an exterior is enhanced and the crack is prevented from being generated on the periphery of the striker in spite of the decrease in size of the striker, thereby preventing durability from being deteriorated.

The front pop-up latch safety hook structure for the active hood of a car according to certain embodiments of the present invention can be applied to the front of the FEM having the narrow space so that the hood absorbs shock in order to reduce injury of the pedestrian by the secondary collision in the front collision accident of the pedestrian.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A front pop-up latch safety hook structure for an active hood of a vehicle, the front pop-up latch safety hook structure being provided in front of a front end module (FEM) including a front end carrier, the structure comprising:
    a plate-shaped frame;
    a safety hook provided at a front side of the plate-shaped frame, the safety hook being configured to be movable between an engagement location with a striker and a release location from the striker;
    a latch configured to engage with or disengage from the striker, wherein the latch includes a latch passive on a bottom thereof; and
    a pop-up means for popping up the hood by forcibly lifting the striker while the latch engages with the striker as the safety hook disengages from the striker when a collision of the vehicle occurs,
    wherein the safety hook integrally includes a lever portion and the lever portion interlocks when the latch passive pivots, and the lever portion of the safety hook is deployed to move by a pin that protrudes in a lateral direction from the latch passive.

2. The front pop-up latch safety hook structure of claim 1, wherein the collision of the vehicle is a pedestrian collision accident.

3. The front pop-up latch safety hook structure of claim 2, wherein
    the pop-up means comprises:
    an actuator provided on a bottom of the plate-shaped frame and configured to be actuated
    by a sensor when the pedestrian collision accident occurs, a pop-up lever pivotably mounted adjacent the actuator, and a pop-up guide pivotably mounted near the pop-up lever.

4. The front pop-up latch safety hook structure of claim 2, wherein the latch is configured to pivot and engage the striker by the pop-up means when the pedestrian collision accident occurs.

5. The front pop-up latch safety hook structure of claim 4, when the latch passive pivots, the latch pivots in a direction to disengage from the striker by interlocking with the safety hook.

6. The front pop-up latch safety hook structure of claim 1, wherein the pin of the latch passive is deployed through a slot formed in the frame and the lever portion of the safety hook deployed through the slot pivots the safety hook in the direction to disengage from the striker by pushing the lever portion by the pin when the latch passive pivots together with the latch.

7. A front pop-up latch safety hook structure for an active hood of a vehicle, the front pop-up latch safety hook structure being provided in front of a front end module (FEM) including a front end carrier, the structure comprising:

a plate-shaped frame;

a safety hook provided in a front side of the plate-shaped frame the safety hook being configured to be movable between an engagement location with a striker and a release location from the striker;

a latch configured to engage with or disengage from the striker; and a pop-up means for popping up the hood by forcibly lifting the striker while the latch engages with the striker as the safety hook disengages from the striker when a collision of the vehicle occurs, wherein the latch includes a latch passive on a bottom thereof and when the latch passive pivots, the latch pivots in a direction to disengage from the striker by interlocking with the safety hook, the safety hook integrally includes a lever portion and the lever portion interlocks when the latch passive pivots, and the lever portion of the safety hook is deployed to move by a pin that protrudes in a lateral direction from the latch passive.

\* \* \* \* \*